(12) United States Patent
Davis

(10) Patent No.: US 7,214,005 B1
(45) Date of Patent: May 8, 2007

(54) SECTIONALIZED FLOOD CONTROL BARRIER

(76) Inventor: George T. Davis, P.O. Box 8542, Mission Hills, CA (US) 91346-8542

( * ) Notice: Subject to any disclaimer, the term of this patent is extended or adjusted under 35 U.S.C. 154(b) by 0 days.

(21) Appl. No.: 11/450,170

(22) Filed: Jun. 12, 2006

(51) Int. Cl.
E02B 7/02 (2006.01)

(52) U.S. Cl. .................. 405/114; 405/107; 405/31; 405/15

(58) Field of Classification Search ........... 405/15, 405/21, 30, 31, 107, 114, 284
See application file for complete search history.

(56) References Cited

U.S. PATENT DOCUMENTS

| | | | | |
|---|---|---|---|---|
| 3,465,530 | A | * | 9/1969 | Renfro .................. 405/114 |
| 4,321,774 | A | | 3/1982 | Fish |
| 4,448,571 | A | * | 5/1984 | Eckels .................. 405/15 |
| 4,661,014 | A | * | 4/1987 | Aubert .................. 405/114 |
| 4,801,220 | A | * | 1/1989 | Bores .................. 405/31 |
| 4,875,804 | A | * | 10/1989 | Bores .................. 405/31 |
| 4,877,349 | A | * | 10/1989 | Greene .................. 405/30 |
| 4,954,012 | A | * | 9/1990 | Wheeler .................. 405/31 |
| 4,966,491 | A | * | 10/1990 | Sample .................. 405/15 |
| 5,741,086 | A | * | 4/1998 | Bores .................. 405/31 |
| 5,791,827 | A | * | 8/1998 | Arvai et al. .................. 405/284 |
| 5,971,661 | A | | 10/1999 | Johnson et al. |
| 5,984,576 | A | | 11/1999 | Zetzsch |
| 5,993,113 | A | | 11/1999 | Darling |
| 6,012,872 | A | * | 1/2000 | Perry et al. .................. 405/114 |
| 6,042,301 | A | | 3/2000 | Sovran |
| 6,059,490 | A | * | 5/2000 | Kauppi .................. 405/114 |
| 6,390,154 | B1 | | 5/2002 | Hall |
| 6,443,655 | B1 | | 9/2002 | Bennett |

* cited by examiner

*Primary Examiner*—Frederick L. Lagman
(74) *Attorney, Agent, or Firm*—Albert O. Cota

(57) ABSTRACT

A sectionalized flood control barrier (10) for mounting on top of a levee or a river bank to prevent flooding. The barrier (10) consists of a footing (20) with a series of support channels (24) that are butted end to end attached to the footing. The support shells are sealed watertight at the interface with each other and also to the footing. A series of primary channel bridge assemblies (32) and secondary channel assemblies (46) are disposed within the support channels (24) and are also butted end to end. Wind protectors (60) contiguously engage each support channel (24) and rest upon the footing for diverting the wind over the barrier. Stepped fastening risers (62) are attached to the footing on each end and over the channel assemblies, and wind protectors hold them securely in place.

20 Claims, 6 Drawing Sheets

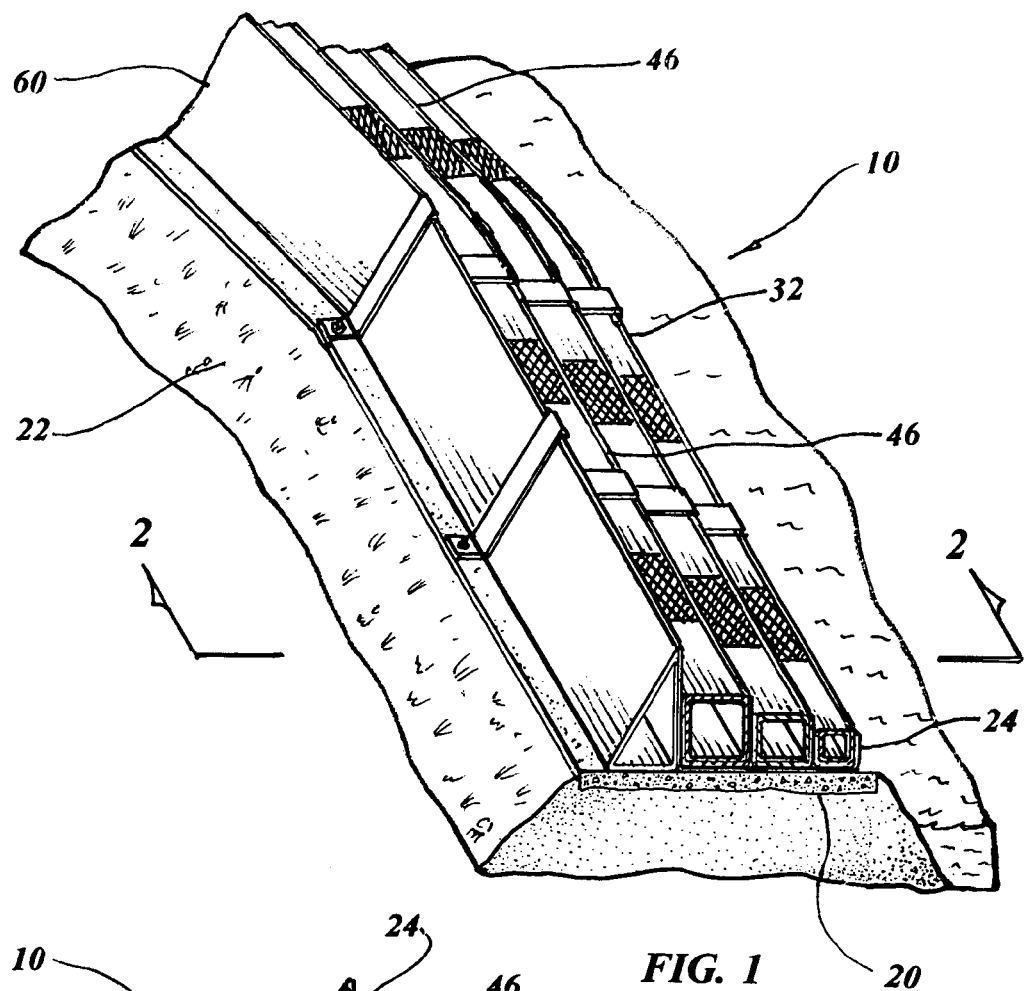
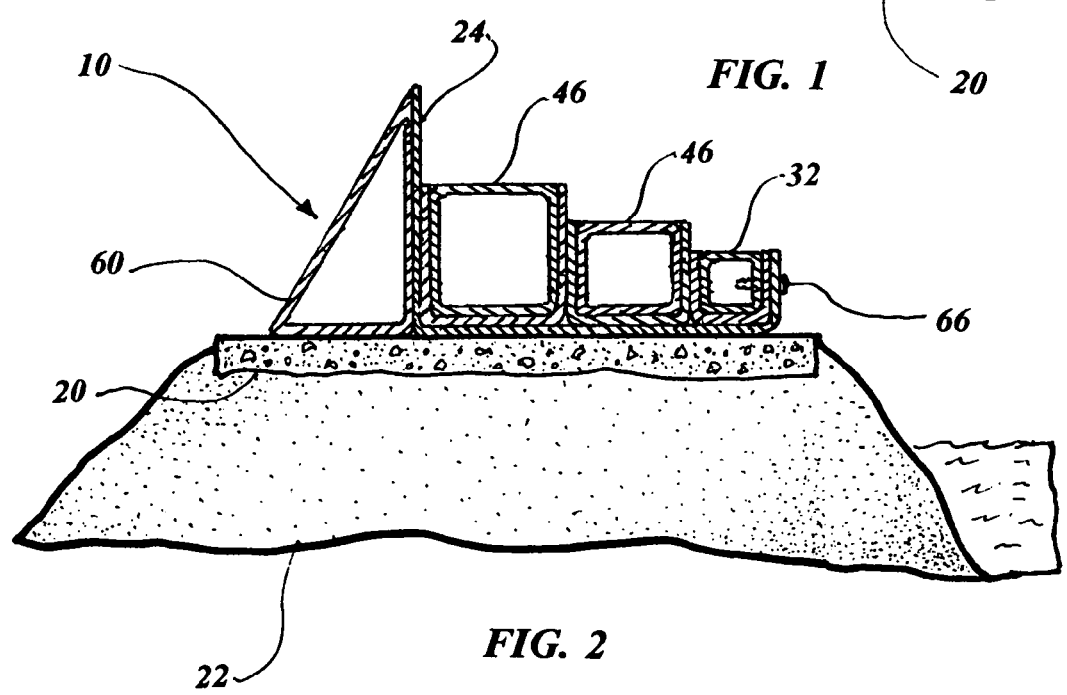
FIG. 1
FIG. 2

SECTIONALIZED FLOOD CONTROL BARRIER

TECHNICAL FIELD

The invention generally pertains to barriers for flood control, and more particularly to a sectionalized multi-compartment barrier that protects a body of water such as a river, from overflowing by positioning the barrier on top of existing levees, flood control areas or adjacent to river banks.

BACKGROUND ART

Previously, many types of barriers have been used to provide an effective means to prevent overflowing of a body of water such as a river.

A search of the prior art did not disclose any patents that possess the novelty of the instant invention; however the following U.S. patents are considered related:

| U.S. Pat. No. | Inventor | Issue Date |
| --- | --- | --- |
| 4,321,774 | Fish | Mar. 30, 1982 |
| 5,971,661 | Johnson et al. | Oct. 26, 1999 |
| 5,984,576 | Zetzsch | Nov. 16, 1999 |
| 5,993,113 | Darling | Nov. 30, 1999 |
| 6,042,301 | Sovran | Mar. 28, 2000 |
| 6,390,154 | Hall | May 21, 2002 |

Fish in U.S. Pat. No. 4,321,774 teaches a flood barrier consisting of a flexible membrane with a base having an end terminating in a bead of polypropylene rope. The sides of the barrier are located on a vertical channel that is further located on the side walls, and a base that is located on the barrier's floor. Typically, the barrier is stowed in a collapsed position and is erected in the event of a flood warning.

U.S. Pat. No. 5,971,661 issued to Johnson et al. is for a water containment device for impeding the flow of water which includes a two-sided body, a base and ends. A valve is disposed in the end and a flap is provided formed as an extension of the base. The flap receives another device impeding the movement of water and is also used to divert the to flow away from a levee should the water level exceed the height of the levee.

Zetzsch in U.S. Pat. No. 5,984,576 discloses a mobile demountable flood barrier having stackable sections. The individual sections engage together by means of horizontal S-shaped toothed projections, thereby transmitting part of the load caused by the pressure of the flood water.

Darling in U.S. Pat. No. 5,993,113 teaches a flood barrier having water fillable tube and cylindrical portions with drain outlets, air relief valves, and anchors. The ends of the tube portions are held in watertight contact with cylindrical junctions. Straps are threaded through the anchors and a saddle on the cylindrical portions prevents rolling.

U.S. Pat. No. 6,042,301 issued to Sovran teaches a temporary barrier having extractable piles that are fitted into holes in the ground, with removable water tight members mounted in between the piles. The water tight members may be made of a stack of metal beams and thick bars.

Hall in U.S. Pat. No. 6,390,154 discloses a portable levee system in the form of a bag having a pre-selected shape. A top portion of the bag is open for receiving fill material. The bag may be deposited by a dispenser towed behind a tractor or a truck for emergency levee construction.

For background purposes and as indicative of the art to which the invention is related reference may be made to the remaining cited patent issued to Bennet in U.S. Pat. No. 6,443,655.

DISCLOSURE OF THE INVENTION

Levees have long protected inhabitants living near bodies of water such as rivers, and have also provided additional land at lower elevations than the adjoining river. While levees are typically constructed at a height that is sufficient to function properly under normal conditions, occasionally a severe storm causes a river to rise quickly and overflow a levee, thereby causing catastrophic damage. Therefore, the primary object of the invention is to provide a sectionalized flood control barrier that is placed on top of a levee, adjacent to a river bank or to a performed concrete or asphalt foundation. The barrier is designed to restrain water and prevent flooding without the necessity of building a new or a higher levee as it either integrates into the existing levee or acts as a stand alone barrier.

An important object of the invention is that the barrier fills automatically from one water level to another slowly, without a sudden surge that causes many barriers to fail.

Another object of the invention is that the barrier provides stability since the weight of the water is distributed over the entire width of the barrier and the weight retains the barrier in place at any level. Since the invention disperses the weight evenly there is no tendency for the barrier to tilt, as it achieves equilibrium and is strong enough to not collapse. Since the barrier is installed on top of an existing levee the stability of the barrier is not impaired relative to sinking, as foundations for the levee are required to reach bedrock or at least deep enough to preclude descending under normal conditions.

Still another object of the invention is the ease of installation, as much of the barrier is made of light weight-plastic material which is easy to handle and assemble with a minimum of labor. Further, the barrier may be positioned directly on packed soil or on a conventional concrete footing added to the top of an existing levee. The barrier is assembled in prefabricated sections that fit together easily and are sealed with conventional waterproof material to prevent leakage.

Yet another object of the invention is the ability of the barrier to be mitered at an angle when installed to follow the contour of a levee or river bank. Since the barrier is plastic a miter saw may be used, and the proper angle is easily ascertained with the mating section simply angled in reverse.

A further object of the invention is the ability of the barrier to be prefabricated in a manufacturing facility with tooling that is easy to produce and equipment that is in present use by factories that normally make this type of product.

A final object of the invention is its ability to be shipped by standard means of transportation, as it is light-weight and modular in construction which permits loading in arrangements that are easily palletized and handled with a fork lift.

These and other objects and advantages of the present invention will become apparent from the subsequent detailed description of the preferred embodiment and the appended claims taken in conjunction with the accompanying drawings.

BRIEF DESCRIPTION OF THE DRAWINGS

FIG. 1 is a fragmentary partial isometric view of the sectionalized flood control barrier in the preferred embodiment installed on a levee by a river.

FIG. 2 is a cross-sectional view taken along lines 2—2 of FIG. 1.

BEST MODE FOR CARRYING OUT THE INVENTION

Figure 11:
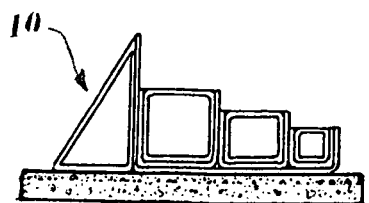
FIG. 11 is a fragmentary partial isometric view of the sectionalized flood control barrier with a concrete footing.
Figure 12:
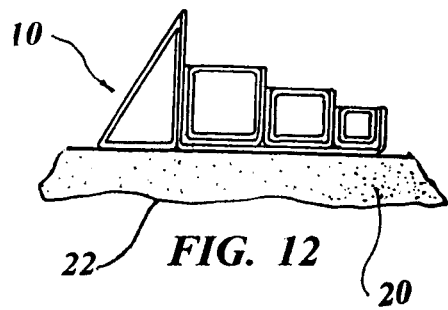
FIG. 12 is a fragmentary partial isometric view of the sectionalized flood control barrier with a sod groundwork footing.
Figure 13:
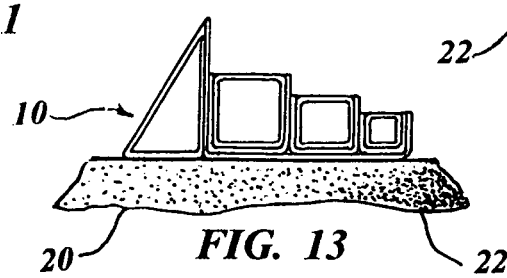
FIG. 13 is a fragmentary partial isometric view of the sectionalized flood control barrier with a compacted soil footing.

The best mode for carrying out the invention is presented in terms of a preferred embodiment for a sectionalized flood control barrier 10 that is placed on a levee or a river bank. The preferred embodiment of the barrier 10, as shown in FIGS. 1 through 21, is comprised of a footing 20 that is disposed on top of a levee 22 or adjacent to a river bank. The footing 20 includes a conventional means for attachment such as protruding studs, recessed threaded fasteners, holes for expansion bolts or the like in concrete embodiments all of which are well known in the art and therefore not illustrated in the drawings. While the footing 20 is preferably made of concrete, as illustrated in FIG. 11, sod groundwork such as depicted pictorially in FIG. 12, or compacted soil, as shown in FIG. 13, may be utilized. Both sod groundwork and compacted soil will function properly for the use intended, however the attachment means would require other well known conventional techniques such as piles, anchor bolts, and the like.

Figure 7:
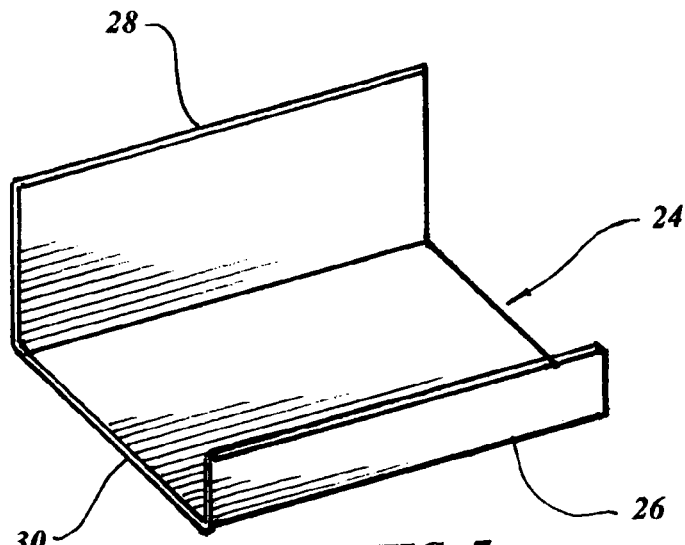
FIG. 7 is a partial isometric view of one of the support shells in the preferred embodiment.
Figure 8:
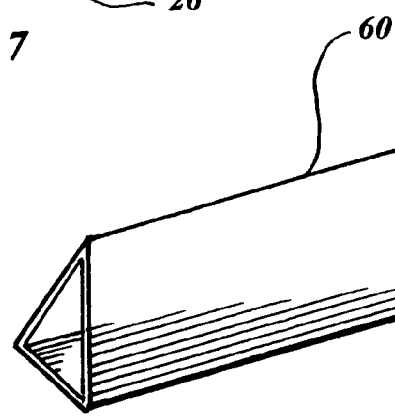
FIG. 8 is a partial isometric view of one of the wind protectors in the preferred embodiment.
Figure 20:
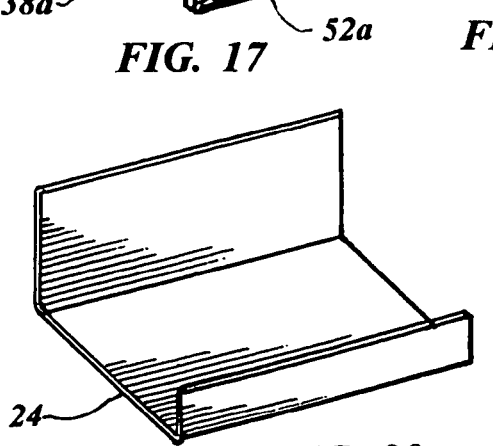
FIG. 20 is a partial isometric view of one of the support shells illustrating the thermoplastic construction.
Figure 21:
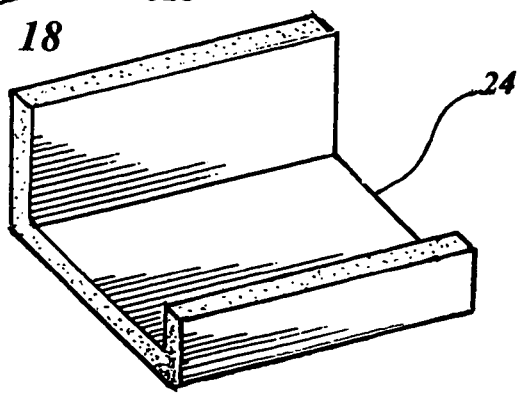
FIG. 21 is a partial isometric view of one of the support shells illustrating the concrete construction.

A series of support channels 24 are butted end to end and attached to the footing 20, as illustrated in FIGS. 1 and 2. Each support channel 24 is configured in a channel shape having a first upstanding leg 26 and a second upstanding leg 28, which are both integral with a web 30, as shown in FIGS. 3, 4, 7, 20 and 21. The second leg 28 preferably has a height greater than the first leg 26, and is extended to provide a final barrier in the event of catastrophic flooding. When the support channels 24 are installed on the footing 20 they are sealed watertight from each other and to the footing 20 with any available watertight sealant. The support channel 24 may be made of a thermoplastic material, as illustrated in FIG. 7, metal, as depicted in FIG. 20, or concrete, as shown pictorially in FIG. 21. However, a thermoplastic material is preferred.

A series of primary channel bridge assemblies 32 are disposed within the support channels 24 and are butted end to end, therefore contiguously engaging the web 30 and first upstanding leg 26 of each support channel 24, as illustrated in FIGS. 1–3 and 17.

Each primary channel bridge assembly 32 consists of a primary base 34 formed in a channel shape. A channel shaped primary screen support 36 nests centrally within the primary base 34, butted between two bridges 44, as shown best in FIG. 5. The primary screen support 36 is preferably one third of the length of the primary base 34 having a width and height complementary in size with an inner surface of the primary base 34.

Figure 3:
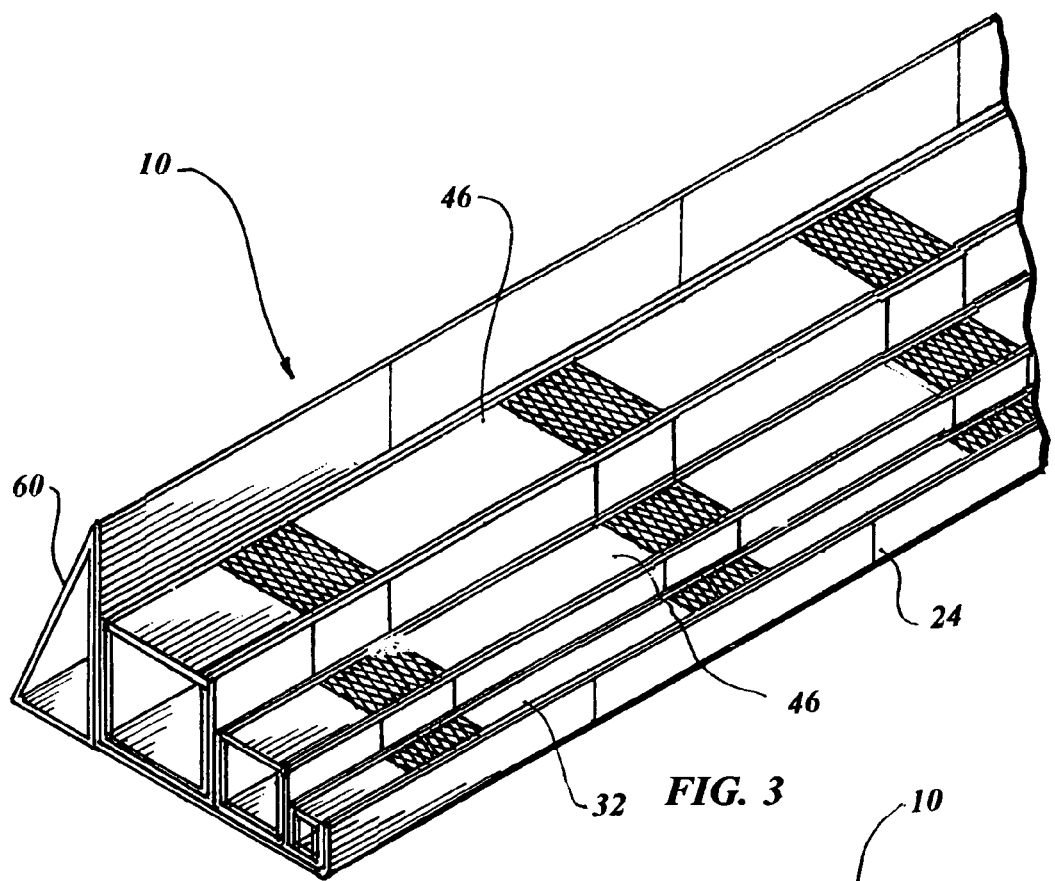
FIG. 3 is a partial isometric view of multiple sections of the flood control barrier butted together.
Figure 4:
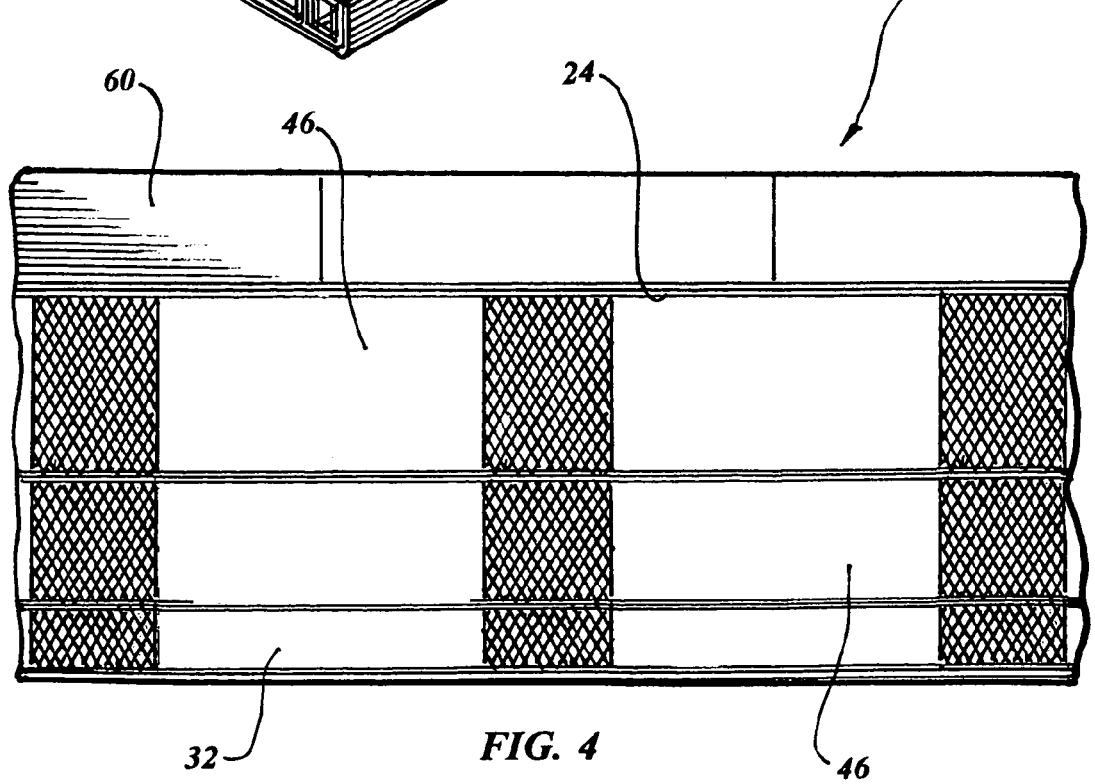
FIG. 4 is a plan elevation view of a typical section of the support channel with multiple primary and secondary channel assemblies installed within, and wind protectors positioned adjacent to the largest upstanding leg of the shell.
Figure 5:
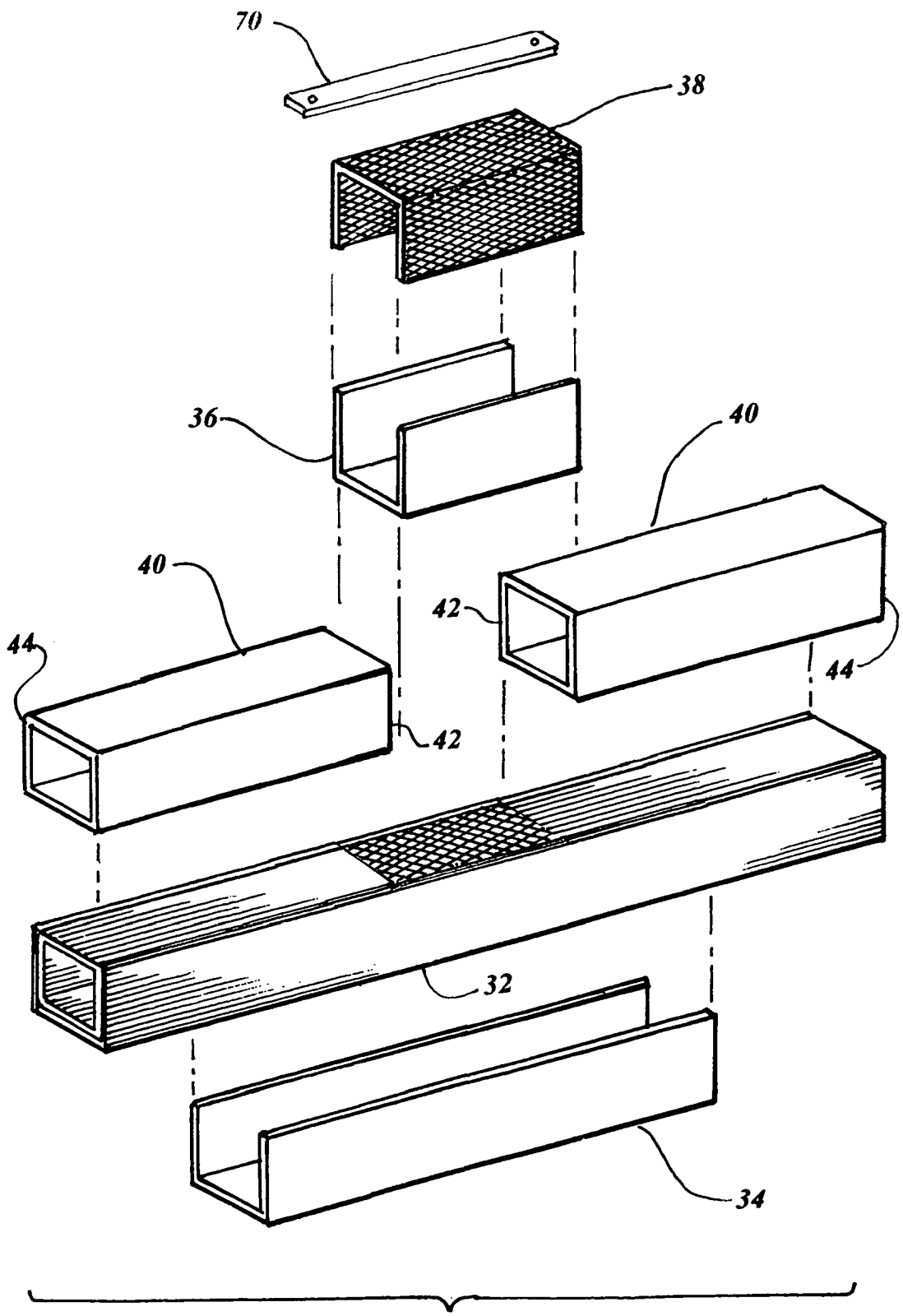
FIG. 5 is an exploded isometric view of one of the primary channel bridge assemblies in the preferred embodiment.

A primary screen 38 is formed in an inverted channel shape and fits within the primary screen support 36, as shown in FIG. 5. The primary screen 38 provides protection from debris entering the primary channel bridge assembly 32 of the barrier 10 and is preferably locked in with an attachment means to the left or right bridge.

A primary tubular sleeve bridge 40 is incorporated in each primary channel bridge assembly 32 and is essentially two thirds the length of the primary base 34 and has a width and height complementary in size with the inner surface of the primary base 34. The primary tubular sleeve bridge 40 nests within two adjoining primary bases 34 and is contiguous with the primary screen support 36 on a first end 42, and extends beyond the end of the primary base 34 into one half of the adjoining base.

Figures 14, 15:
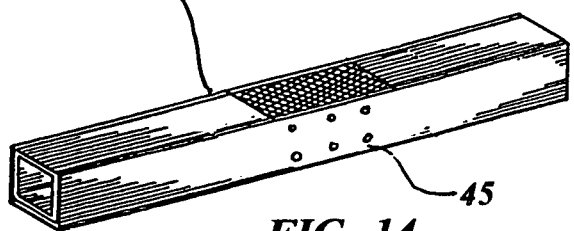
FIG. 14 is a partial isometric view of one of the primary channel bridge assemblies in the preferred embodiment illustrating the mating drain holes.
FIG. 15 is a partial isometric view of one of the secondary channel assemblies in the preferred embodiment illustrating the mating drain holes on a first side.
Figure 17:
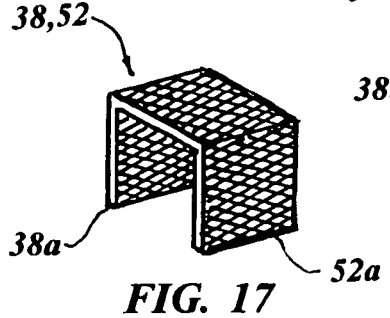
FIG. 17 is a partial isometric view of one of the channel shaped primary screens illustrating the expanded metal construction.
Figure 18:
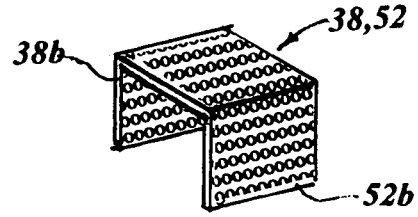
FIG. 18 is a partial isometric view of one of the channel shaped primary screens illustrating the perforated metal construction.
Figure 19:
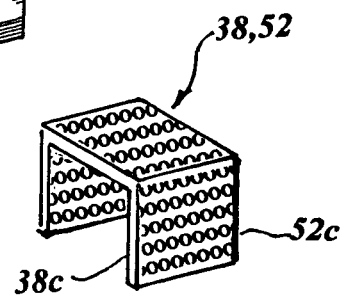
FIG. 19 is a partial isometric view of one of the channel shaped primary screens illustrating the perforated thermoplastic construction.

The primary channel bridge assemblies 32 are made of thermoplastic, except for the primary screens 38, which may be expanded metal 38a, as shown in FIG. 17; perforated metal 38b, depicted in FIG. 18; or perforated thermoplastic 38c, as illustrated in FIG. 19. The primary base 34 and the primary screen support 36, shown in FIG. 5, have mating drain holes 45 on a side opposite the support channel 24, as depicted in FIG. 14.

A plural series of secondary channel assemblies 46 are disposed within the adjoining outer support channel 24. The assemblies 46 are butted end to end and contiguously engage the primary channel bridge assemblies 32, other secondary channel assemblies 46 and each support channel 24 second upstanding leg 28, as shown best in FIGS. 1–4.

Each secondary channel assembly 46 is two thirds the size of the channel with one third resting in two adjoining channels and consists of a secondary base 48 formed in a channel shape. A channel shaped secondary screen support 50 nests centrally within the secondary base 48, as shown best in FIG. 6.

Figure 6:
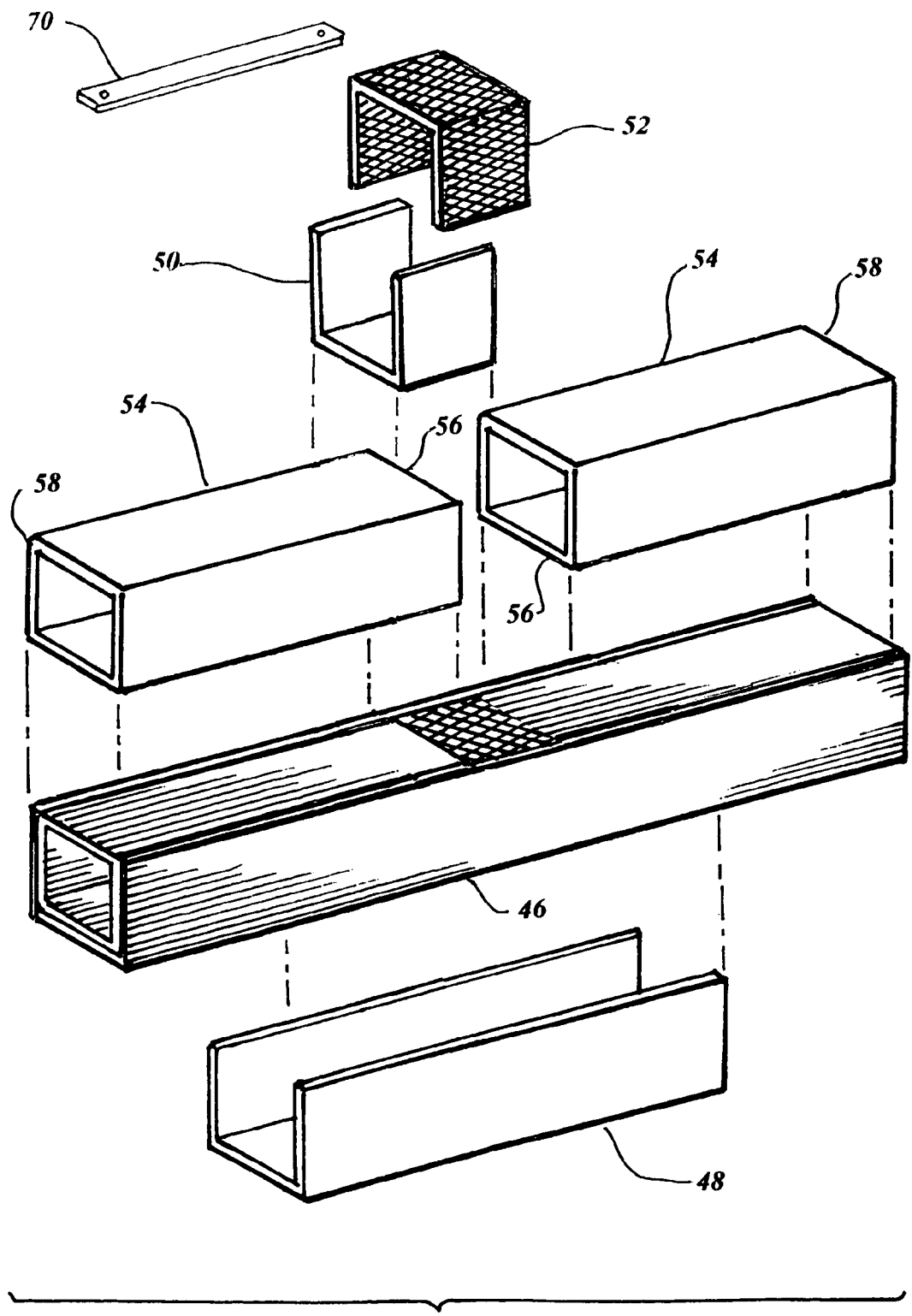
FIG. 6 is an exploded isometric view of one of the secondary channel assemblies in the preferred embodiment.

A secondary screen 52 is formed in an inverted channel shape and fits within the secondary screen support 50, as shown in FIG. 6, and provides protection from debris entering the secondary channel assembly 46 of the barrier 10 and any of the interior areas such as the channels, bridges etc.

A secondary tubular sleeve bridge 54 is incorporated one third in and one third out of each secondary channel assembly 46 and nests one third beyond the secondary base 48 contiguous with the secondary screen support 50 on a first end 56, and extends outward one third beyond the secondary base 48 on a second end 58. The purpose of the one third extension is to increase the structural integrity of the interface connection.

Figure 16:
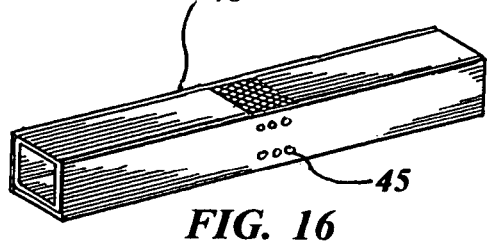
FIG. 16 is a partial isometric view of one of the secondary channel assemblies in the preferred embodiment illustrating the mating drain holes on a second side.

The secondary channel assemblies 46 are made of thermoplastic, except for the secondary screens 52, which may be expanded metal 52a, as shown in FIG. 17; perforated metal 52b, as depicted in FIG. 18; or perforated thermoplastic 52c, as illustrated in FIG. 19. The secondary base 48 and the secondary screen support 50 have mating drain holes 45 on both sides, as depicted in FIGS. 15 and 16.

The secondary channel assemblies 46 may progressively increase from 1.25 to 1.75 times than the primary channel bridge assemblies 32, and sequential secondary channel assemblies 46 may progressively increase from 1.25 to 1.75 times than its previous contiguous secondary channel assembly 46.

A single primary bridge assembly 32 and two secondary channel assemblies 46 are illustrated in the drawings, however there may be multiple secondary channel assemblies 46 according to the application and as such are not limited to the quantity shown, as it is anticipated that any number and size will still be within the parameters of the invention.

A series of wind protectors 60, which contiguously engage each support channel second leg 28 and rest upon the footing 20, are utilized for diverting the wind over the barrier 10 instead of blowing the barrier over in the event of a catastrophic storm with hurricane force winds. The wind protectors 60 are formed as a three-sided triangle, as shown in FIGS. 1–3 and 8, and are preferably made of a thermoplastic material. It is anticipated that a solid triangular member may be located inside each end for additional support.

Figure 9:
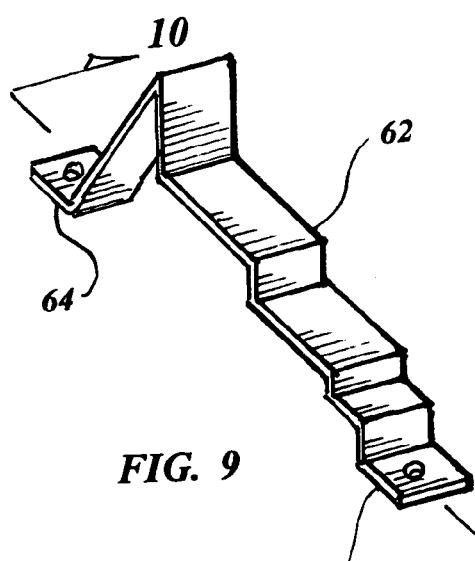
FIG. 9 is a partial isometric view of one of the stepped fastening risers in the preferred embodiment.
Figure 10:
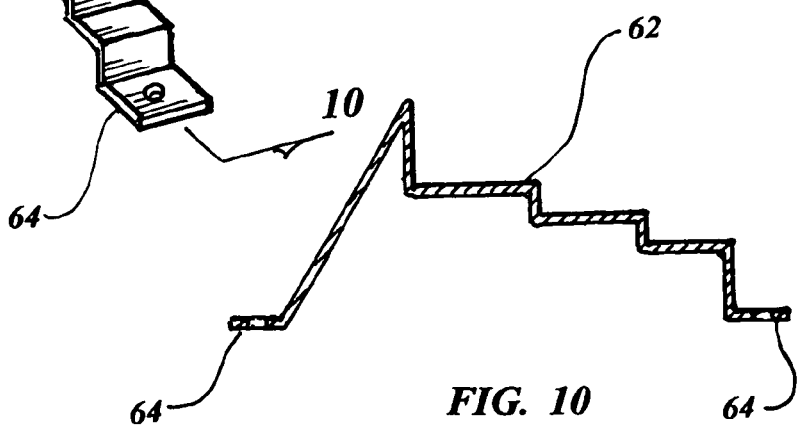
FIG. 10 is a cross-sectional view taken along lines 10—10 of FIG. 9.

A series of stepped fastening risers 62, as shown in FIGS. 9 and 10, are attached on each distal end to the footing 20. Each riser 62 is fastened to each support channel 24, primary channel bridge assembly 32, secondary channel assemblies 46, and wind protector 60, as illustrated in FIG. 1. The stepped fastening risers 62 have a configuration that includes a flat 64 on each end that interfaces with the footing 20 for connection thereto. The risers 62 are stepped vertically to contiguously engage sides of the support channels 24, and horizontally to contiguously engage tops of the primary channel bridge assemblies 32, secondary channel assemblies 46, and angular sides of the wind protectors 60. The stepped fastening risers 62 may be made of thermoplastic, aluminum, stainless steel or galvanized steel. Optionally stepped fasteners may be made into two or more pieces that overlap each other when assembled on channels or bridges.

The sectionalized flood control barrier 10 may utilize screws 66 for attaching the support channels 24, primary channel bridge assemblies 32, secondary channel assemblies 46, wind protectors 60, and stepped fastening risers 62 together. FIG. 2 illustrates a single representative screw 66; however screws 66 may be used throughout the installation with their positioning, type and material all well known in the art.

A levee 22 or a river bank is seldom formed by nature in a straight line, therefore mitered ends 68 are anticipated on selected portions of flood control barrier 10, thus allowing the barrier 10 to follow the contour of the levee 22 or river bank, as illustrated in FIG. 1. The mitered ends 68 may be pre-formed by the manufacturer or may be cut during the installation to follow the exact curvature required.

A lock 70 is screwed at each end of the bridge as illustrated in FIGS. 5 and 6.

While the invention has been described in detail and pictorially shown in the accompanying drawings, it is not to be limited to such details, since many changes and modifications may be made to the invention without departing from the spirit and scope thereof. For example, the flood control barrier 10 can also be placed around the perimeter of a building such as a hospital or retirement homes. Hence, it is described to cover any and all modifications and forms which may come within the language and scope of the appended claims.

The invention claimed is:

1. A sectionalized flood control barrier which comprises a series of support shells that are butted end to end and attached to a flat surface, wherein said support shells are sealed watertight from each other and to the flat surface, with a series of channel assemblies of progressively larger sizes disposed within the support shells, thereby providing reinforcement for the support shells.

2. A sectionalized flood control barrier which comprises:
   a) a flat surface for mounting,
   b) a series of channel shaped support channels that are butted end to end and attached to the flat surface, wherein said support channels are sealed watertight from each other and to the flat surface, and
   c) a series of channel bridge assemblies of progressively larger sizes disposed within the support channels, thereby providing reinforcement for the support channels.

3. A sectionalized flood control barrier for mounting on a levee or a river bank, wherein said barrier comprises:
   a) a footing disposed on top of a levee or adjacent to a river bank, said footing having means for attachment,
   b) a series of support channels that are butted end to end and attached to the footing, wherein each support channel having a first upstanding leg and a second upstanding leg both integral with a web, and the second leg having a height greater than the first leg, wherein said support channels are sealed watertight from each other and to the footing,
   c) a series of primary channel bridge assemblies disposed within the support channels that are butted end to end, and contiguously engaging said web and said first upstanding leg of each support channel,
   d) a series of secondary channel assemblies disposed within the outer support channel that is butted end to end, and contiguously engaging a surface selected from the group consisting of primary channel bridge assemblies, secondary channel assemblies and support channel second upstanding legs,
   e) a series of wind protectors that contiguously engage each support channel second leg and rest upon said footing for diverting the wind over the barrier, and f) a series of stepped fastening risers that are attached on each distal end to said footing, with each riser fastened to each support channel, primary channel bridge assembly, secondary channel assembly, and wind protector.

4. The sectionalized flood control barrier as recited in claim 3 wherein said footing further comprises a material that is selected from the group consisting of concrete, sod groundwork and compacted soil.

5. The sectionalized flood control barrier as recited in claim 3 wherein said support channels are further comprised of a material that is selected from the group consisting of thermoplastic, metal and concrete.

6. The sectionalized flood control barrier as recited in claim 3 wherein each primary channel bridge assembly further comprises:
  a) a primary base formed in a channel shape,
  b) a channel shaped primary screen support having essentially one third the length of the primary base and a width and height complementary in size with an inner surface of the primary base, with the primary screen support nesting centrally within the primary base,
  c) a primary screen formed in an inverted channel shape fitting within the primary screen support, thereby providing protection from debris entering the primary channel bridge assemblies of the barrier, and
  d) a primary tubular sleeve bridge having essentially two thirds the length of the primary base and a width and height complementary in size with an inner surface of the primary base, with the primary tubular sleeve bridge nesting within the primary base contiguous with the primary screen support on one end and extending outward from the primary base on the other end.

7. The sectionalized flood control barrier as recited in claim 6 wherein said primary base and said primary screen support having mating drain holes on a side opposite the support shell.

8. The sectionalized flood control barrier as recited in claim 6 wherein said primary screen material is selected from the group consisting of expanded metal, perforated metal and perforated thermoplastic.

9. The sectionalized flood control barrier as recited in claim 6 wherein said primary channel bridge assemblies are formed of thermoplastic, except for the primary screens.

10. The sectionalized flood control barrier as recited in claim 3 wherein each secondary channel assembly further comprises:
  a) a secondary base formed in a channel shape,
  b) a channel shaped secondary screen support having essentially one third the length of the secondary base and a width and height complementary in size with an inner surface of the secondary base, with the secondary screen support nesting centrally within the secondary base,
  c) a secondary screen formed in an inverted channel shape fitting within the secondary screen support, thereby providing protection from debris entering the secondary base of the barrier, and
  d) a secondary tubular sleeve bridge having essentially two thirds the length of the secondary base and a width and height complementary in size with an inner surface of the secondary base, thereby permitting the secondary tubular sleeve bridge to nest within the secondary base contiguous with the secondary screen support on one end and extending outward from the secondary base on the other end.

11. The sectionalized flood control barrier as recited in claim 10 wherein said secondary base and said secondary screen support having mating drain holes on each vertical side.

12. The sectionalized flood control barrier as recited in claim 10 wherein said secondary screen material is selected from the group consisting of expanded metal, perforated metal and perforated thermoplastic.

13. The sectionalized flood control barrier as recited in claim 10 wherein said secondary channel assemblies are formed of thermoplastic, except for the secondary screens.

14. The sectionalized flood control barrier as recited in claim 3 wherein said wind protectors further having a three-sided triangular shape made of a thermoplastic material.

15. The sectionalized flood control barrier as recited in claim 3 wherein said stepped fastening risers further comprise a configuration having a flat on each end touching said footing, with the risers stepped vertically to contiguously engage sides of the support shells, and horizontally to contiguously engage tops of said primary channel bridge assemblies, secondary channel assemblies, and angular sides of the wind protectors.

16. The sectionalized flood control barrier as recited in claim 3 wherein said stepped fastening riser further comprises a material that is selected from the group consisting of thermoplastic, aluminum, stainless steel and galvanized steel.

17. The sectionalized flood control barrier as recited in claim 3 wherein said secondary channel assemblies progressively increase from 1.25 to 1.75 times than said primary channel bridge assemblies, and said secondary channel assemblies progressively increase from 1.25 to 1.75 times than each previous secondary channel assembly.

18. The sectionalized flood control barrier as recited in claim 3 further comprising a plurality of screws for attaching said support shells, said primary channel bridge assemblies, said secondary channel assemblies, said wind protectors, and said stepped fastening risers together.

19. The sectionalized flood control barrier as recited in claim 3 further comprising a water tight sealant disposed between the footing and the support shells also a watertight sealant disposed where the support shells butt together.

20. The sectionalized flood control barrier as recited in claim 3 further comprising mitered ends on selected portions of said flood control barrier, thereby allowing the barrier to follow the contour of a levee or river bank.

* * * * *